United States Patent
Nagai

(10) Patent No.: US 8,559,526 B2
(45) Date of Patent: Oct. 15, 2013

(54) APPARATUS AND METHOD FOR PROCESSING DECODED IMAGES

(75) Inventor: Toshiyuki Nagai, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 519 days.

(21) Appl. No.: 12/904,879

(22) Filed: Oct. 14, 2010

(65) Prior Publication Data

US 2011/0229028 A1 Sep. 22, 2011

(30) Foreign Application Priority Data

Mar. 17, 2010 (JP) ................................. 2010-061328

(51) Int. Cl.
*H04N 11/02* (2006.01)
*H04N 5/21* (2006.01)

(52) U.S. Cl.
USPC .. 375/240.26; 348/625; 348/606; 375/240.25

(58) Field of Classification Search
None
See application file for complete search history.

(56) References Cited

U.S. PATENT DOCUMENTS

| 7,430,021 | B2 * | 9/2008 | Nako et al. ..................... | 348/672 |
|---|---|---|---|---|
| 7,450,182 | B2 | 11/2008 | Nakajima et al. | |
| 2003/0081854 | A1 * | 5/2003 | Deshpande ................... | 382/261 |
| 2006/0078055 | A1 | 4/2006 | Kanazawa | |
| 2006/0098743 | A1 | 5/2006 | Nakajima et al. | |
| 2008/0310516 | A1 | 12/2008 | Kobayashi et al. | |
| 2009/0268064 | A1 | 10/2009 | Mizuno et al. | |

FOREIGN PATENT DOCUMENTS

| JP | 9-081104 | 3/1997 |
|---|---|---|
| JP | 2005142891 | 6/2005 |
| JP | 2006013735 | 1/2006 |
| JP | 2006115078 | 4/2006 |
| JP | 2006-135571 | 5/2006 |
| JP | 2008035001 | 2/2008 |
| JP | 2008283341 | 11/2008 |
| JP | 2008311951 | 12/2008 |
| JP | 2009201103 | 9/2009 |
| JP | 2009-282556 | 12/2009 |

OTHER PUBLICATIONS

Japanese Patent Application No. 2010-061328, Notice of Rejection, mailed Jan. 25, 2011, (with English Translation).

* cited by examiner

*Primary Examiner* — Stephen R Koziol
*Assistant Examiner* — Raphael Schwartz
(74) *Attorney, Agent, or Firm* — Blakely, Sokoloff, Taylor & Zafman LLP

(57) ABSTRACT

According to one embodiment, an image processing apparatus includes a decoder, a first sharpening module, and a second sharpening module. The decoder decodes an encoded image to obtain a decoded image. The first sharpening module performs first sharpening on the decoded image. The second sharpening module performs second sharpening on the decoded image subjected to the first sharpening. The second sharpening requires a different processing time from a processing time required for the first sharpening. The first sharpening module includes a first noise remover that removes noise generated by encoding from the decoded image.

11 Claims, 5 Drawing Sheets

FIG.4A

| ITEM | CONTENTS |
|---|---|
| QUANTIZATION STEP (QUANTIZATION SCALE) | SMALL ←——————→ LARGE |
| EFFECT OF SHARPENING | LOW ←——————→ HIGH |

FIG.4B

| ITEM | CONTENTS |
|---|---|
| ENCODING SCHEME | H.264/MPEG-4 AVC ←——————→ MPEG-2 |
| EFFECT OF SHARPENING | LOW ←——————→ HIGH |

FIG.4C

| ITEM | CONTENTS |
|---|---|
| PICTURE TYPE | B-, P-PICTURE ←——————→ I-PICTURE |
| EFFECT OF SHARPENING | LOW ←——————→ HIGH |

FIG.4D

| ITEM | CONTENTS |
|---|---|
| FREQUENCY HISTOGRAM | LOW ←——————→ HIGH |
| EFFECT OF SHARPENING | LOW ←——————→ HIGH |

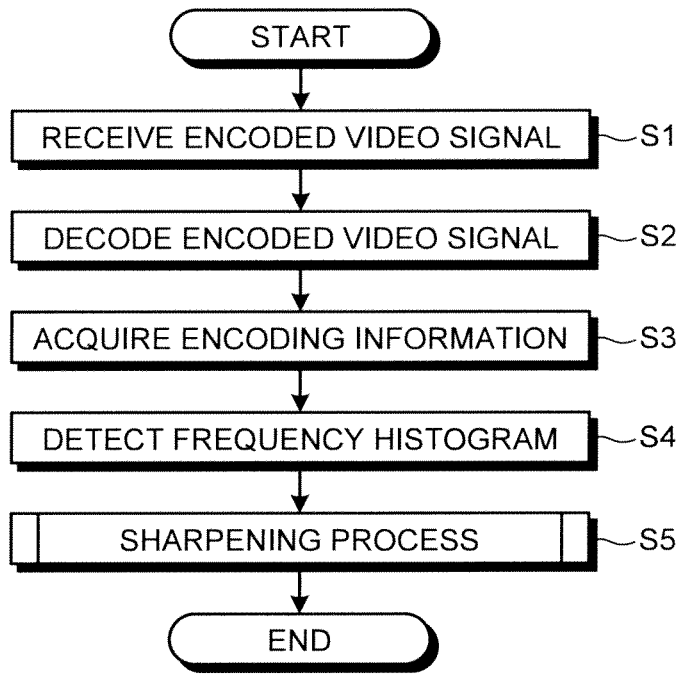
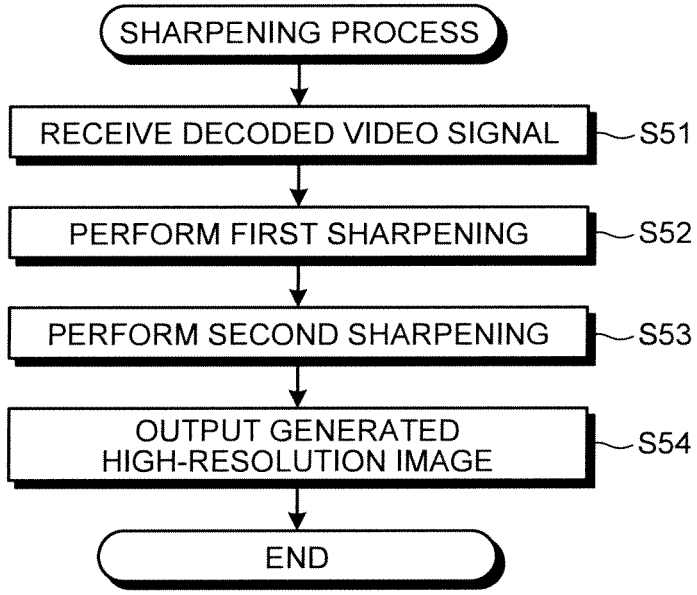

APPARATUS AND METHOD FOR PROCESSING DECODED IMAGES

CROSS-REFERENCE TO RELATED APPLICATIONS

This application is based upon and claims the benefit of priority from Japanese Patent Application No. 2010-061328, filed Mar. 17, 2010, the entire contents of which are incorporated herein by reference.

FIELD

Embodiments described herein relate generally to an image processing apparatus and an image processing method.

BACKGROUND

Generally, a moving image is encoded when transmitted or stored to increase the transmission efficiency and the compression efficiency. Upon receipt of the encoded moving image, the receiving side decodes the image, and performs noise reduction (NR) to reduce block noise/mosquito noise occurring due to encoding and sharpening to improve image quality on the decoded image to reproduce it.

For example, Japanese Patent Application Publication (KOKAI) No. 2006-135571 discloses a conventional technology for noise reduction and sharpening. According to the conventional technology, image quality correction such as contour correction and noise reduction is performed based on information related to frame encoding obtained upon decoding.

It is difficult to perform both sharpening and noise reduction to reduce block noise/mosquito noise together. With the conventional technology, noise generated by encoding cannot be reduced without influence on the improvement of image quality by sharpening.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIGS. 4A to 4D are exemplary conceptual diagrams of sharpening process performed by the sharpening controller in the embodiment;

FIG. 5 is an exemplary flowchart of the operation of the image processing apparatus in the embodiment;

FIG. 6 is an exemplary flowchart of the operation of the sharpening processor in the embodiment.

DETAILED DESCRIPTION

Various embodiments will be described hereinafter with reference to the accompanying drawings. In general, according to one embodiment, an image processing apparatus comprises a decoder, a first sharpening module, and a second sharpening module. The decoder is configured to decode an encoded image to obtain a decoded image. The first sharpening module is configured to perform first sharpening on the decoded image. The second sharpening module is configured to perform second sharpening on the decoded image subjected to the first sharpening. The second sharpening requires a different processing time from a processing time required for the first sharpening. The first sharpening module comprises a first noise remover configured to remove noise generated by encoding from the decoded image.

According to another embodiment, there is provided an image processing method applied to an image processing apparatus configured to decode an encoded image and sharpen the image. The image processing method comprises: a decoder decoding an encoded image to obtain a decoded image; a first sharpening module performing first sharpening on the decoded image; and a second sharpening module performing second sharpening on the decoded image subjected to the first sharpening. The second sharpening requires a different processing time from a processing time required for the first sharpening. The first sharpening includes removing noise generated by encoding from the decoded image.

A description will now be given of an image processing apparatus and an image processing method according to an embodiment. In the embodiment, a video (moving image) signal encoded by a predetermined encoding scheme is decoded and sharpened to a fine video signal to be output. The image processing apparatus and the image processing method of the embodiment may be applied to recording on a large-capacity storage medium such as a television (TV) receiver, a hard disk drive (HDD), and a digital versatile disk (DVD), and reproduction of recorded data on a recorder/player that reproduces recorded data such as a tuner and a set top box.

Figure 1:
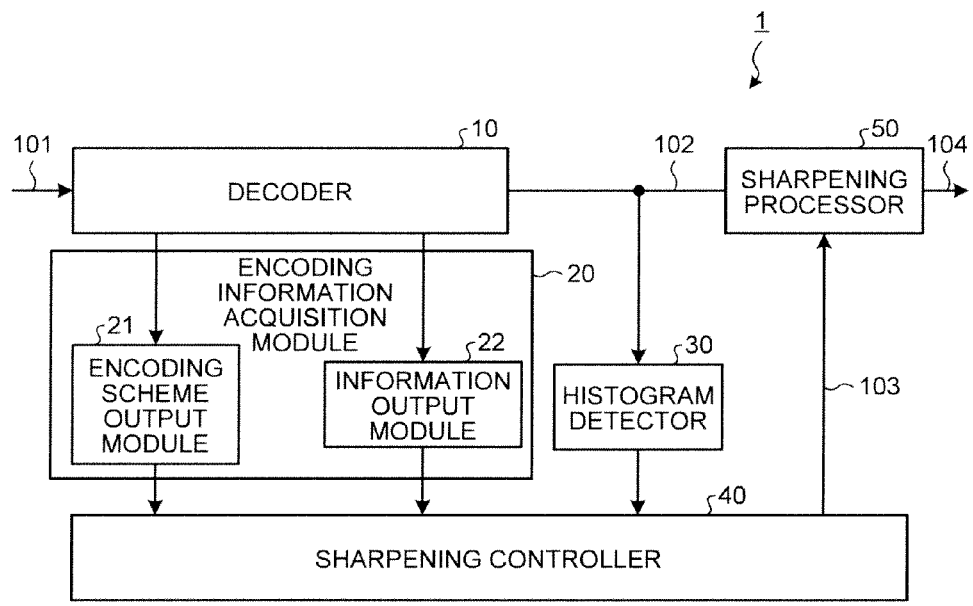
FIG. 1 is an exemplary block diagram of an image processing apparatus according to an embodiment.

FIG. 1 is a block diagram of an image processing apparatus 1 according to the embodiment. As illustrated in FIG. 1, the image processing apparatus 1 comprises a decoder 10, an encoding information acquisition module 20, a histogram detector 30, a sharpening controller 40, and a sharpening processor 50. The elements of the image processing apparatus 1 may be formed of chips such as microcontrollers, respectively, or may be formed of a single chip. The elements of the image processing apparatus 1 may also be implemented by computer programs that the central processing unit (CPU) loads from a read only memory (ROM) or the like into the work area of a random access memory (RAM) and sequentially executes.

The decoder 10 decodes an encoded video signal 101 encoded by a predetermined encoding scheme. The decoder 10 may perform H.264/MPEG-4 advanced video coding (AVC) decoding, MPEG-2 decoding, or the like. The decoder 10 outputs the video signal thus decoded to the histogram detector 30 and the sharpening processor 50 as a decoded video signal 102. Besides, the decoder 10 acquires encoding information applied to encoding of the encoded video signal 101 when decoding it and outputs the encoding information to the encoding information acquisition module 20.

More specifically, the encoding information includes information related to the encoding scheme such as H.264/MPEG-4 AVC, MPEG-2, or the like, the picture type of a field or a frame, quantization information, and the like. The picture type indicates group of pictures (GOP) including I-picture, P-picture, and B-picture that constitutes the minimum structure of a video image defined by MPEG. The quantization information indicates the accuracy of quantization upon encoding and may be, for example, quantization step in a field or a frame, average macroblock quantization scale in a field or a frame, and the like.

The encoding information acquisition module 20 comprises an encoding scheme output module 21 and an information output module 22, and receives the encoding information output from the decoder 10. The encoding information is received as being once classified for the encoding scheme output module 21 or the information output module 22. More specifically, if the encoding information is related to the encoding scheme, it is received as being classified for the encoding scheme output module 21. On the other hand, if the encoding information is related to the picture type, the quantization information, or the like, it is received as being classified for the information output module 22.

The encoding scheme output module 21 receives the type of encoding scheme applied to the encoded video signal 101 such as H.264/MPEG-4 AVC, MPEG-2, or the like. The encoding scheme output module 21 outputs the type of encoding scheme to the sharpening controller 40. The information output module 22 receives the picture type and the quantization information with respect to each field or frame of the encoded video signal 101. The information output module 22 outputs the picture type and the quantization information to the sharpening controller 40.

The histogram detector 30 detects a frequency histogram with respect to each field or frame of the decoded video signal 102, in which the horizontal axis represents frequency component while the vertical axis represents the appearance count (the number of pixels). The histogram detector 30 outputs the detected frequency histogram to the sharpening controller 40. The detection of the frequency histogram enables the sharpening controller 40 to determine the number of existing pixels corresponding to each frequency component in the field or frame of the decoded video signal 102. That is, the sharpening controller 40 can determine whether the field or frame is mainly formed of low frequency pixels or high frequency pixels.

The sharpening controller 40 controls the intensity of the effect of sharpening in the sharpening processor 50 according to the type of encoding scheme output from the encoding scheme output module 21, the picture type or the quantization information output from the information output module 22, and the frequency histogram output from the histogram detector 30. More specifically, the sharpening controller 40 outputs a control signal 103 corresponding to the output of the encoding scheme output module 21, the information output module 22, and the histogram detector 30 to control the intensity of the effect of sharpening in the sharpening processor 50 (the details will be described later).

The sharpening processor 50 performs the image processing (sharpening) on the decoded video signal 102 to increase the resolution, thereby generating a video signal 104 with a higher resolution than that of the decoded video signal 102. For example, the sharpening processor 50 generates the video signal 104 with a high-definition (HD) resolution of 1920× 1080 from the decoded video signal 102 with a resolution of 1440×1080. Besides, the sharpening processor 50 performs sharpening using the control signal 103 from the sharpening controller 40.

The term "sharpening" as used herein refers to a process to enhance a predetermined signal contained in an input video signal to generate a video signal with a higher resolution than that of the input video signal. The sharpening includes a process to perform only enhancement without a change in the resolution of a video signal before and after the sharpening. The sharpening also includes a process (super-resolution enhancement), in which, from a video signal with a standard definition (SD) resolution (720×480) or an intermediate resolution (1440×1080), i.e., first resolution, an original pixel value is estimated to increase the pixels and thus to restore a video signal with a high resolution (for example, HD resolution), i.e., second resolution higher than the first resolution.

The original pixel value refers to the value of each pixel of a video signal obtained by, for example, photographing the same object as that of an image with the first resolution with a camera capable of capturing an image with the second resolution.

Besides, "original pixel value is estimated to increase pixels" means to obtain the characteristics of images to find a correlated image, and estimate an original pixel value from neighboring images (in the same frame or between frames) using the correlated image to increase pixels.

The super-resolution enhancement (sharpening) in the sharpening processor 50 is not limited to the process as described above. While a process, in which an original pixel value is estimated from a video signal with a low or intermediate resolution to increase the pixels to thereby restore a video signal with a high resolution, is described above by way of example, the super-resolution enhancement may be performed in any other manners. The super-resolution enhancement includes a process in which the resolution histogram of video is analyzed and optimal high-image quality process is performed according to the resolution. For example, the super-resolution enhancement includes sharpening corresponding to a resolution (for example, a resolution of 1920× 1080) obtained by analyzing the resolution histogram of video of a video signal received with the HD resolution (1920×1080). In this case, although the resolution does not change by the super-resolution enhancement, the viewer feels that the resolution of video increases.

Figure 2:
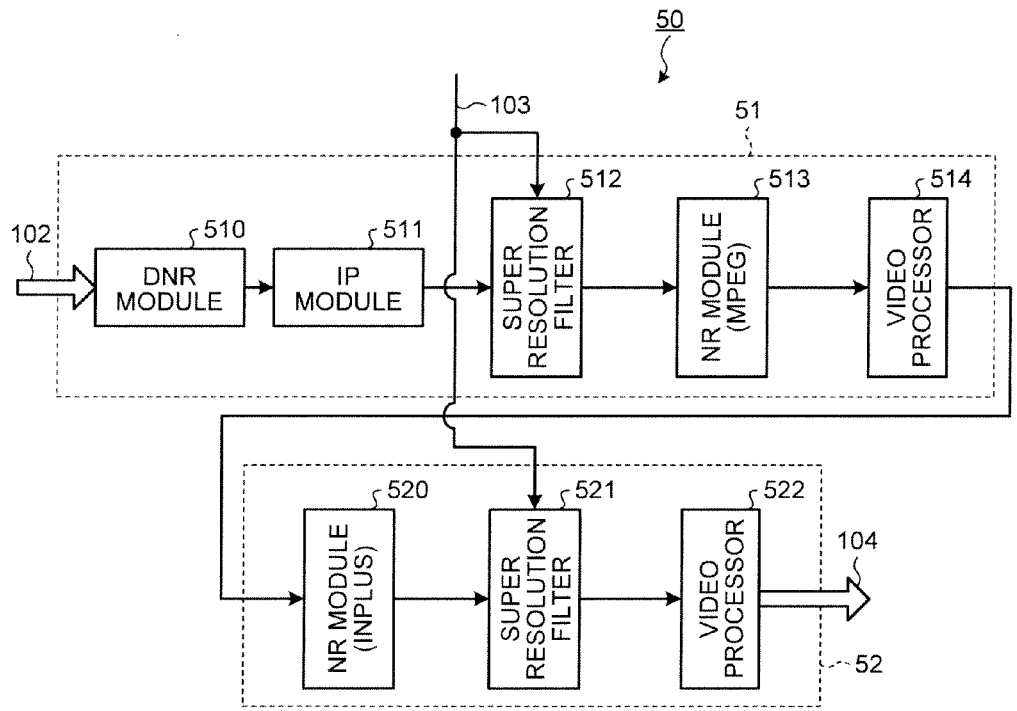
FIG. 2 is an exemplary block diagram of a sharpening processor in the embodiment.

The configuration of the sharpening processor 50 will be described with reference to FIG. 2. FIG. 2 is a block diagram of the sharpening processor 50. As illustrated in FIG. 2, the sharpening processor 50 comprises a first sharpening processor 51 and a second sharpening processor 52. The first sharpening processor 51 performs sharpening on the decoded video signal 102 as described above. The second sharpening processor 52 performs sharpening on the video signal sharpened by the first sharpening processor 51 as described above.

The first sharpening processor 51 and the second sharpening processor 52 are formed of, for example, individual chips. Sharpening of the first sharpening processor 51 requires a different time from that of the second sharpening processor 52, and it takes the second sharpening processor 52 a longer time to perform sharpening. The difference in time required for sharpening is caused by the differences in chip performance, algorithm, the accuracy of sharpening, and the like. For example, in a sharpening process, when a video signal, in which pixels are increased by estimating the original pixel values, is compared with the original video signal to restore a video signal of a high resolution with fewer errors, the comparison and the restoration are repeated, which increases required processing time. If there is a difference in the speed of software processing and operation between the chips of the first sharpening processor 51 and the second sharpening processor 52, when performing sharpening on a video signal of the same data volume or sharpening that achieves the same effect, for example, the first sharpening processor 51 requires 0.1 second while the second sharpening processor 52 requires 0.2 second. In this manner, sharpening of the second sharpening processor 52 requires a longer processing time.

More specifically, the first sharpening processor 51 comprises a dynamic noise reduction (DNR) module 510, an Internet protocol (IP) module 511, a super resolution filter 512, an NR module 513, and a video processor 514. The second sharpening processor 52 comprises an NR module 520, a super resolution filter 521, and a video processor 522.

The DNR module 510 performs averaging operation between a plurality of frames or fields and removes random noise contained in the decoded video signal 102, thereby outputting it to the IP module 511. The IP module 511 converts the input video signal from an interlaced format to a progressive format, and outputs it to the super resolution filter 512.

The super resolution filter 512 is used for the effect of sharpening (gain adjustment, coring adjustment of a weak signal, etc.), and outputs the video signal to the NR module 513 after filtering. In the super resolution filter 512, the effect of sharpening is controlled based on the control signal 103. For example, the effect of sharpening can be increased by increasing the gain and reducing the coring of a weak signal. Meanwhile, the effect of sharpening can be decreased by reducing the gain and increasing the coring of a weak signal.

The NR module 513, as a first noise reduction module, removes noise unique to a video signal subjected to MPEG encoding, and outputs the video signal after noise reduction to the video processor 514. More specifically, the NR module 513 removes block noise (mosaic-like artifacts) and mosquito noise on the edge of letters and the like (noise resembling mosquitoes swarming around the contour of letters). The video processor 514 estimates the original pixel value to increase pixels, thereby obtaining a video signal with a high resolution.

The NR module 520, as a second noise reduction module, removes impulse noise (noise of scattered white spots) from a video signal subjected to sharpening by the first sharpening processor 51, and outputs the video signal after noise reduction to the super resolution filter 521. This enables the removal of the impulse noise with a large amplitude that cannot be removed because of the characteristics of the first sharpening processor 51 (the details will be described later).

The super resolution filter 521 is used for the effect of sharpening as with the super resolution filter 512, and outputs the video signal to the video processor 522 after filtering. The video processor 522 estimates the original pixel value to increase pixels, as with the video processor 514, thereby obtaining a video signal with a high resolution.

Figure 3:
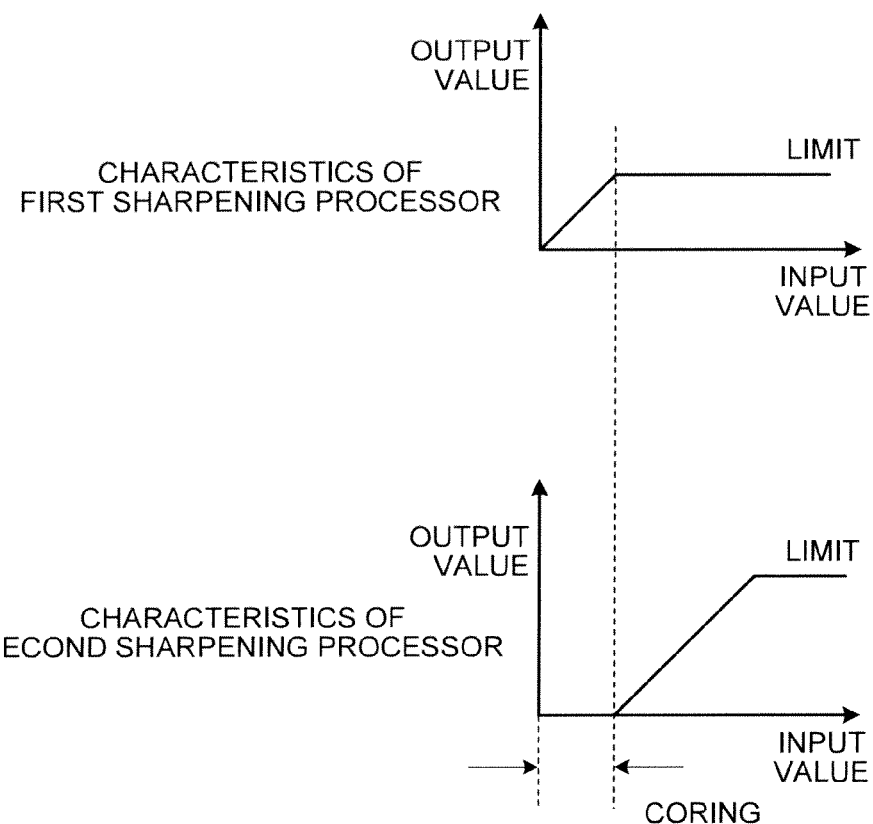
FIG. 3 is an exemplary conceptual diagram of sharpening process performed by a sharpening controller in the embodiment.

A description will be given of the characteristics of the first sharpening processor 51 and the second sharpening processor 52. FIG. 3 is a conceptual diagram illustrating the characteristics of the first sharpening processor 51 and the second sharpening processor 52. The difference in characteristics between the first sharpening processor 51 and the second sharpening processor 52 is caused by the difference in filter characteristics between the super resolution filter 512 and the super resolution filter 521.

More specifically, as illustrated in FIG. 3, the coring is set to prevent processing from working on a component with an amplitude less than a predetermined level in the second sharpening processor 52. Accordingly, the second sharpening processor 52 performs sharpening on a pixel component with an amplitude higher than the predetermined level. On the other hand, the first sharpening processor 51 performs sharpening on a pixel component with an amplitude equal to or less than the level set as the coring in the second sharpening processor 52.

As described above, noise unique to an encoded video signal is removed by the first sharpening processor 51 that requires less time to perform sharpening. Since the second sharpening processor 52 requires more time than the first sharpening processor 51, which causes a time lag, the effect is low in the removal of noise with a small amplitude unique to an encoded video signal. Therefore, the first sharpening processor 51 that requires less processing time removes noise unique to an encoded video signal. This enables effective noise removal without affecting the image quality in the second sharpening processor 52. Further, after the removal of noise unique to an encoded video signal, the second sharpening processor 52 performs sharpening on a pixel component with a large amplitude. Thus, it is possible to minimize the effect of noise unique to an encoded video signal on the image quality in the sharpening process.

With reference to FIGS. 4A, 4B, 4C, and 4D, a description will be given of the control of the sharpening controller 40 by the sharpening processor 50. FIGS. 4A, 4B, 4C, and 4D are conceptual diagrams of sharpening process performed by the sharpening controller 40. As illustrated in FIG. 4A, the sharpening controller 40 controls the intensity of the effect of sharpening in the sharpening processor 50 according to the quantization information (quantization step, quantization scale, etc.) indicating the accuracy of quantization of the encoded video signal 101 obtained by the information output module 22, i.e., the level of the accuracy of quantization.

More specifically, if the quantization step and the quantization scale are large and the accuracy of quantization of the encoded video signal 101 is low, the sharpening controller 40 outputs to the sharpening processor 50 the control signal 103 to reduce the effect of sharpening performed by the super resolution filters 512 and 521. Thus, the sharpening controller 40 reduces the effect of sharpening in the sharpening processor 50. On the other hand, if the quantization step and the quantization scale are small and the accuracy of quantization of the encoded video signal 101 is high, the sharpening controller 40 outputs to the sharpening processor 50 the control signal 103 to increase the effect of sharpening performed by the super resolution filters 512 and 521. Thus, the sharpening controller 40 increases the effect of sharpening in the sharpening processor 50.

When the quantization step and the quantization scale are large and the accuracy of quantization of the encoded video signal 101 is low, coding distortion is likely to occur. If intense sharpening is performed on a video signal containing a distortion component resulting from the coding distortion, the image quality may degrade. Accordingly, when the accuracy of quantization of the encoded video signal 101 is low, the effect of sharpening is reduced to prevent the distortion component caused by the coding distortion from being amplified by the sharpening.

As illustrated in FIG. 4B, the sharpening controller 40 controls the intensity of the effect of sharpening in the sharpening processor 50 according to the encoding scheme of the encoded video signal 101 obtained by the encoding scheme output module 21. More specifically, in the case of MPEG-2 encoding, the sharpening controller 40 outputs to the sharpening processor 50 the control signal 103 to reduce the effect of sharpening performed by the super resolution filters 512 and 521. Thus, the sharpening controller 40 reduces the effect of sharpening in the sharpening processor 50. On the other hand, in the case of H.264/MPEG-4 AVC encoding, the sharpening controller 40 outputs to the sharpening processor 50 the control signal 103 to increase the effect of sharpening performed by the super resolution filters 512 and 521. Thus, the sharpening controller 40 increases the effect of sharpening in the sharpening processor 50.

The coding distortion is more likely to occur in MPEG-2 encoding than in H.264/MPEG-4 AVC encoding. Accordingly, when MPEG-2 encoding is used, the effect of sharpening is reduced. With this, it is possible to prevent the distortion component caused by the coding distortion from being amplified by the sharpening.

As illustrated in FIG. 4C, the sharpening controller 40 controls the intensity of the effect of sharpening in the sharpening processor 50 according to the picture type of the encoded video signal 101 obtained by the information output module 22. More specifically, in the case of I-picture, the sharpening controller 40 outputs to the sharpening processor 50 the control signal 103 to reduce the effect of sharpening performed by the super resolution filters 512 and 521. Thus, the sharpening controller 40 reduces the effect of sharpening in the sharpening processor 50. On the other hand, in the case of P-picture and B-picture, the sharpening controller 40 outputs to the sharpening processor 50 the control signal 103 to increase the effect of sharpening performed by the super resolution filters 512 and 521. Thus, the sharpening controller 40 increases the effect of sharpening in the sharpening processor 50.

I-picture is generated singularly from an encoding signal. P-picture is generated using motion compensation prediction in one direction based on difference information between I-picture and P-picture in GOP. B-picture is generated using bilateral prediction based on difference information from preceding and subsequent I-picture or P-picture. Accordingly, in the GOP cycle, a small amplitude difference (noise-detail component) contained in I-picture appears in a video image as periodic flicker. Therefore, if the picture type is I-picture, the effect of sharpening is reduced. With this, it is possible to prevent the periodic flicker from being amplified by the sharpening.

As illustrated in FIG. 4D, the sharpening controller 40 controls the intensity of the effect of sharpening in the sharpening processor 50 according to the frequency histogram of the decoded video signal 102 detected by the histogram detector 30. More specifically, if the decoded video signal 102 represents a field or a frame mainly formed of high-frequency component pixels, the sharpening controller 40 outputs to the sharpening processor 50 the control signal 103 to reduce the effect of sharpening performed by the super resolution filters 512 and 521. Thus, the sharpening controller 40 reduces the effect of sharpening in the sharpening processor 50. On the other hand, if the decoded video signal 102 represents a field or a frame mainly formed of low-frequency component pixels, the sharpening controller 40 outputs to the sharpening processor 50 the control signal 103 to increase the effect of sharpening performed by the super resolution filters 512 and 521. Thus, the sharpening controller 40 increases the effect of sharpening in the sharpening processor 50.

In this manner, in the case of a field or a frame mainly formed of high-frequency component pixels, the sharpening controller 40 reduces the effect of sharpening. With this, it is possible to prevent noise contained in high-frequency component from being amplified by the sharpening.

With reference to FIGS. 5 and 6, a description will be given of the operation of the image processing apparatus 1. FIG. 5 is a flowchart of an example of the operation of the image processing apparatus 1.

As illustrated in FIG. 5, upon receipt of the encoded video signal 101 (S1), the decoder 10 decodes the encoded video signal 101 encoded by a predetermined encoding scheme (S2). Next, the encoding information acquisition module 20 acquires encoding information and outputs it to the sharpening controller 40 (S3). More specifically, the encoding scheme output module 21 of the encoding information acquisition module 20 outputs the encoding scheme of the encoded video signal 101 to the sharpening controller 40, while the information output module 22 outputs the picture type and the quantization information of the encoded video signal 101 to the sharpening controller 40.

Thereafter, the histogram detector 30 detects a frequency histogram with respect to each field or frame of the decoded video signal 102, and outputs the detected frequency histogram to the sharpening controller 40 (S4). Under the control of the sharpening controller 40, the sharpening processor 50 then performs sharpening on the input decoded video signal 102 to generate the video signal 104 with a resolution higher than that of the decoded video signal 102 (S5). More specifically, the sharpening controller 40 outputs the control signal 103 based on the frequency histogram and the encoding information received from the encoding information acquisition module 20 to the sharpening processor 50. In the sharpening processor 50, sharpening is performed on the decoded video signal 102 according to the control signal 103 to generate the video signal 104. That is, in the sharpening process by the sharpening processor 50 for the decoded video signal 102, the intensity of the effect of sharpening is controlled based on the control signal 103.

FIG. 6 is a flowchart of an example of the operation of the sharpening processor 50. More specifically, FIG. 6 illustrates an example of the sharpening process performed by the sharpening processor 50. As illustrated in FIG. 6, when the sharpening processor 50 receives the decoded video signal 102 (S51), the first sharpening processor 51 performs sharpening (first sharpening) on the decoded video signal 102 (S52). Then, the second sharpening processor 52 performs sharpening (second sharpening) on the video signal subjected to the sharpening by the first sharpening processor 51 (S53). After that, the second sharpening processor 52 outputs the generated high-resolution image as the video signal 104 (S54).

Figure 7:
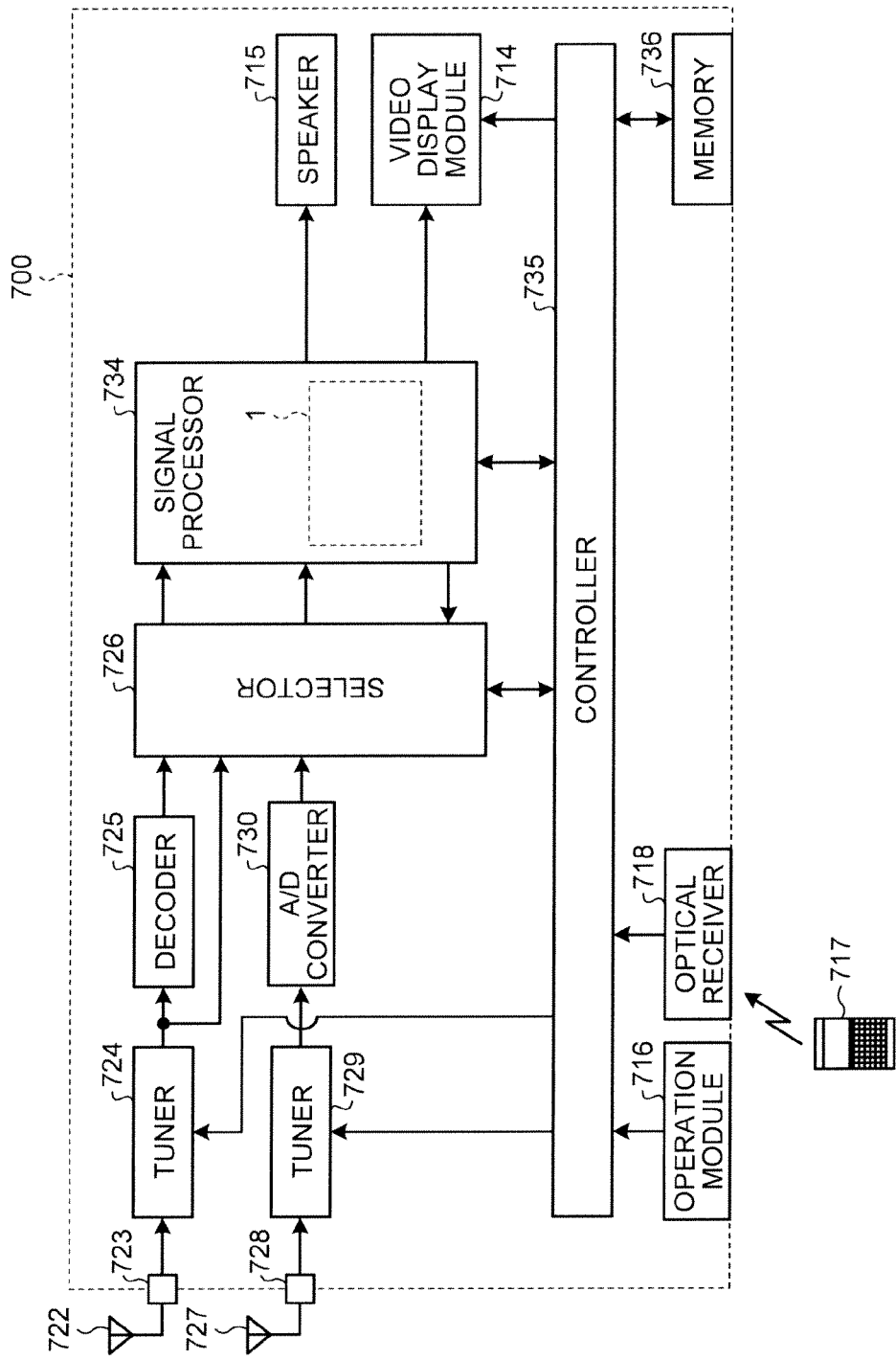
FIG. 7 is an exemplary block diagram of a television broadcast receiver provided with the image processing apparatus in the embodiment.

With reference to FIG. 7, a description will be given of an example in which the image processing apparatus 1 is applied to a TV broadcast receiver. FIG. 7 is a block diagram of a TV broadcast receiver 700 comprising the image processing apparatus 1.

As illustrated in FIG. 7, the image processing apparatus 1 described referring to FIG. 1 is provided in a signal processor 734 of the TV broadcast receiver 700. In the TV broadcast receiver 700, a digital TV broadcast signal received by an antenna 722 for receiving digital TV broadcast is supplied to a tuner 724 via an input terminal 723. The tuner 724 selects a signal of a desired channel from input digital TV broadcast signals and demodulates the signal.

The output of the tuner 724 is decoded by a decoder 725 as well as being directly supplied to a selector 726. The selector 726 separates video/audio data from the signal. The video/audio data obtained by the selector may be stored in HDD through a controller 735.

An analog TV broadcast signal received by an antenna 727 for receiving analog TV broadcast is supplied to a tuner 729 via an input terminal 728. The tuner 729 selects a signal of a desired channel from input analog TV broadcast signals and demodulates the signal. The signal output from the tuner 729 is digitalized by an analog-to-digital (A/D) converter 730 and supplied to the selector 726.

The selector 726 selects one of the two types of input digital video and audio signals and outputs the selected signal to the signal processor 734. The signal processor 734 performs predetermined signal processing on the input digital video signal and displays it on a video display module 714. The video display module 714 may be, for example, a flat panel display such as liquid crystal display (LCD), plasma display, and the like. The signal processor 734 also performs predetermined signal processing on the input digital audio signal to convert it to an analog signal and outputs it to a speaker 715 to reproduce the sound.

The controller 735 controls the overall operation of the TV broadcast receiver 700 including receiving operation. The controller 735 is a microprocessor comprising a built-in CPU or the like. The controller 735 controls each module in response to operational information received by an operation module 716 such as an operation key or operational information sent from a remote controller 717 and received through an optical receiver 718 so that the operational information is reflected to the operation of the TV broadcast receiver 700. In this case, the controller 735 uses a memory 736. The memory 736 mainly comprises a ROM that stores a control program executed by the CPU, a RAM that provides the CPU with a work area, and a nonvolatile memory that stores various types of setting information and control information.

While the above process is described by way of example as being performed on a field or a frame of a video image (moving image), if the encoded image is a still image, the same process may be performed on the still image.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An image processing apparatus comprising:
   a decoder configured to decode an encoded image to obtain a decoded image;
   a first sharpening module configured to perform sharpening as first sharpening on the decoded image, the first sharpening module comprises a first noise remover configured to remove noise generated by encoding from the decoded image; and
   a second sharpening module configured to perform sharpening as second sharpening on the decoded image subjected to the first sharpening, the second sharpening requiring a different processing time from a processing time required for the first sharpening,
   wherein the first sharpening module is configured to perform the sharpening on a pixel component with an amplitude equal to or less than a predetermined level contained in the decoded image, and the second sharpening module is configured to perform the sharpening on a pixel component with an amplitude larger than the predetermined level contained in the decoded image subjected to the first sharpening.

2. The image processing apparatus of claim 1, wherein the first noise remover is configured to remove block noise and mosquito noise in the noise generated by encoding, and the second sharpening module comprises a second noise remover configured to remove impulse noise from the decoded image.

3. The image processing apparatus of claim 1, wherein the sharpening includes super-resolution enhancement.

4. The image processing apparatus of claim 3, further comprising:
   an acquisition module configured to acquire encoding information related to encoding of the encoded image; and
   a controller configured to control effect of the sharpening based on the encoding information.

5. The image processing apparatus of claim 4, wherein
   the encoding information includes quantization information indicating accuracy of quantization upon generating the encoded image, and
   the controller is configured to control the effect of the sharpening based on the quantization information such that the effect of the sharpening is reduced as the accuracy decreases.

6. The image processing apparatus of claim 5, wherein
   the quantization information is a quantization step in a field or a frame, and
   the controller is configured to control the effect of the sharpening such that the effect of the sharpening is reduced as the quantization step increases.

7. The image processing apparatus of claim 5, wherein
   the quantization information is an average macroblock quantization scale in a field or a frame, and
   the controller is configured to control the effect of the sharpening such that the effect of the sharpening is reduced as the average macroblock quantization scale increases.

8. The image processing apparatus of claim 4, wherein
   the encoding information includes an encoding scheme applied to the encoded image, and
   the controller is configured to control the effect of the sharpening according to the encoding scheme.

9. The image processing apparatus of claim 4, wherein
   the encoding information includes a picture type upon generating the encoded image, and
   the controller is configured to control the effect of the sharpening according to the picture type.

10. The image processing apparatus of claim 4, further comprising a detector configured to detect a frequency histogram indicating existing pixels corresponding to each frequency component from the decoded image, wherein
    the controller is configured to control the effect of the sharpening such that the effect of the sharpening is reduced for a decoded image containing a larger number of high-frequency component pixels based on the frequency histogram.

11. An image processing method applied to an image processing apparatus configured to decode an encoded image and sharpen the image, the image processing method comprising:
    decoding, by a decoder, an encoded image to obtain a decoded image;
    performing, by a first sharpening module, first sharpening on the decoded image by at least removing noise generated by encoding from the decoded image; and
    performing, by a second sharpening module, second sharpening on the decoded image subjected to the first sharpening, the second sharpening requiring a different processing time from a processing time required for the first sharpening,
    wherein the first sharpening module is configured to perform the sharpening on a pixel component with an amplitude equal to or less than a predetermined level contained in the decoded image, and the second sharpening module is configured to perform the sharpening on a pixel component with an amplitude larger than the predetermined level contained in the decoded image subjected to the first sharpening.

* * * * *